(12) United States Patent
Shubs, Jr.

(10) Patent No.: US 9,688,296 B2
(45) Date of Patent: Jun. 27, 2017

(54) REMOTE DATA BACKUP FOR LOCOMOTIVE ON-BOARD EQUIPMENT

(71) Applicant: Electro-Motive Diesel, Inc., Lagrange, IL (US)

(72) Inventor: Alexander Shubs, Jr., Chicago, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 14/886,608

(22) Filed: Oct. 19, 2015

(65) Prior Publication Data
US 2017/0106886 A1    Apr. 20, 2017

(51) Int. Cl.
*B61L 27/00* (2006.01)
*G05D 1/00* (2006.01)
*B61L 27/04* (2006.01)

(52) U.S. Cl.
CPC ....... *B61L 27/0077* (2013.01); *B61L 27/0038* (2013.01); *B61L 27/04* (2013.01); *G05D 1/0022* (2013.01); *B61L 2201/00* (2013.01)

(58) Field of Classification Search
CPC .......... G07C 5/00; G07C 5/0808; G06F 19/00
See application file for complete search history.

(56) References Cited

U.S. PATENT DOCUMENTS 4,906,970 A * 3/1990 Momura ............... G07C 5/0808
340/438

6,984,946 B2 * 1/2006 Donnelly ................ B60L 3/102
105/61
7,676,804 B2   3/2010 Ferguson et al.
(Continued)

FOREIGN PATENT DOCUMENTS

CN         100542867         9/2009

*Primary Examiner* — Thomas Tarcza
*Assistant Examiner* — Alex C Dunn
(74) *Attorney, Agent, or Firm* — Finnegan, Henderson, Farabow, Garrett & Dunner LLP

(57) ABSTRACT

A remote data backup system for a locomotive may include a communication unit on-board the locomotive configured to be communicatively coupled with an off-board server. The communication unit may be configured to transmit data to the off-board server and receive at least one of data, commands, and applications from the off-board server. The remote data backup system may also include a central processing module on-board the locomotive comprising a cab electronics system configured to receive and store on-board equipment operational data from outputs of one or more of machine gauges, indicators, sensors, and controls in an on-board memory, process and integrate the received equipment operational data, receive additional equipment operational data and one or more control command signals from the off-board server, and communicate commands based on the equipment operational data and the received control command signals. The system may also perform a self-check upon startup of the locomotive to determine whether equipment operational data is present in the on-board memory, and request a download of previously uploaded data from the off-board server if the self-check determines that no equipment operational data is present in the on-board memory.

20 Claims, 3 Drawing Sheets

(56) References Cited

U.S. PATENT DOCUMENTS

| | | | |
|---|---|---|---|
| 7,688,218 B2* | 3/2010 | LeFebvre | B61K 9/00 246/169 R |
| 8,239,078 B2* | 8/2012 | Siddappa | B61C 17/12 455/92 |
| 8,364,338 B2 | 1/2013 | Peltonen et al. | |
| 8,370,006 B2* | 2/2013 | Kumar | B61L 3/006 701/19 |
| 8,655,515 B2 | 2/2014 | Noffsinger et al. | |
| 8,868,267 B2 | 10/2014 | Deitz et al. | |
| 2006/0005736 A1* | 1/2006 | Kumar | B60L 11/1801 105/1.4 |
| 2006/0271246 A1* | 11/2006 | Bell | B60R 25/04 701/1 |
| 2012/0016607 A1* | 1/2012 | Cottrell | G05B 23/0229 702/62 |
| 2013/0198802 A1* | 8/2013 | Ricci | H04L 63/10 726/1 |
| 2013/0204484 A1* | 8/2013 | Ricci | G06F 17/00 701/29.4 |
| 2013/0261842 A1* | 10/2013 | Cooper | B61L 15/0081 701/1 |
| 2014/0039754 A1* | 2/2014 | Nishizawa | B60L 1/003 701/34.4 |
| 2014/0059534 A1 | 2/2014 | Daum et al. | |
| 2014/0172205 A1 | 6/2014 | Ruhland et al. | |
| 2015/0073629 A1* | 3/2015 | Kraeling | B61C 17/02 701/19 |
| 2015/0185716 A1* | 7/2015 | Wichmann | F01K 23/101 700/287 |
| 2016/0109411 A1* | 4/2016 | Pellegrino | G01N 29/043 702/39 |

\* cited by examiner

REMOTE DATA BACKUP FOR LOCOMOTIVE ON-BOARD EQUIPMENT

TECHNICAL FIELD

The present disclosure relates generally to a remote data backup system and, more particularly, to a remote data backup system for locomotive on-board equipment.

BACKGROUND

Rail vehicles may include multiple powered units, such as locomotives, that are mechanically coupled or linked together in a consist. The consist of powered units operates to provide tractive and/or braking efforts to propel and stop movement of the rail vehicle. The powered units in the consist may change the supplied tractive and/or braking efforts based on a data message that is communicated to the powered units. For example, the supplied tractive and/or braking efforts may be based on Positive Train Control (PTC) instructions or control information for an upcoming trip. The control information may be used by a software application to determine the speed of the rail vehicle for various segments of an upcoming trip of the rail vehicle.

A goal in the operation of the locomotives in a train is to eliminate the need for an operator on-board the train. In order to achieve the goal of providing automatic train operation (ATO), a reliable control system must be provided in order to transmit train control commands and other data indicative of operational characteristics associated with various subsystems of the locomotive consists between the train and an off-board server (sometimes located at a "back office"). The data regarding on-board equipment operational characteristics may be gathered in real-time and constantly updated and stored for use in controlling, monitoring, and enhancing operations of the train. The control system must be capable of transmitting data messages having the information used to control the tractive and/or braking efforts of the rail vehicle and the operational characteristics of the various consist subsystems while the rail vehicle is moving. The control system must also be able to transmit information regarding a detected fault on-board a locomotive, and respond with control commands to reset the fault.

One example of a train that includes a control system that allows the transfer of control commands from a lead locomotive to a remote locomotive is disclosed in U.S. Pat. No. 8,364,338 of Peltonen et al. that issued on Jan. 29, 2013 ("the '338 patent"). In particular, the '338 patent discloses a system and method for remotely administering a fault detected on an unmanned powered system that is controlled through a lead powered system. The method includes detecting an operational fault on an unmanned powered system, communicating information about the fault to the lead powered system through a wireless communication protocol, and communicating a reset message to the unmanned powered system.

Although useful in allowing for control of an unmanned remote trailing locomotive in a train by wireless signals sent from a lead locomotive of the train, the system of the '338 patent may be limited. In particular, the '338 patent does not provide a way for automatically maintaining, backing up, and updating the on-board equipment operational data. A failure, repair, or replacement of an on-board central processing module and associated memory may result in the loss of important on-board equipment operational data necessary for control of the locomotive.

The present disclosure is directed at overcoming one or more of the shortcomings set forth above and/or other problems of the prior art.

SUMMARY

In one aspect, the present disclosure is directed to a remote data backup system for a locomotive. The backup system may include a communication unit on-board the locomotive configured to be communicatively coupled with an off-board server. The communication unit may be configured to transmit data to the off-board server and receive at least one of data, commands, and applications from the off-board server. The backup system may also include a central processing module on-board the locomotive. The central processing module may include a cab electronics system configured to receive and store on-board equipment operational data from outputs of one or more of machine gauges, indicators, sensors, and controls in an on-board memory, process and integrate the received equipment operational data, receive additional equipment operational data and one or more control command signals from the off-board server, and communicate commands based on the equipment operational data and the received one or more control command signals. The cab electronics system may also perform a self-check upon startup of the locomotive to determine whether equipment operational data is present in the on-board memory, and request a download of previously uploaded data from the off-board server if the self-check determines that no equipment operational data is present in the on-board memory. The central processing module may also include a locomotive control system, wherein the locomotive control system is configured to receive commands communicated from the cab electronics system, and actuate one or more operational control devices based on the commands from the cab electronics system. The central processing module may be in wireless communication with the off-board server through the communication unit.

In another aspect, the present disclosure is directed to a method of maintaining data regarding operational characteristics of equipment on-board a locomotive. The method may include starting up the locomotive, checking an on-board memory of the locomotive with an on-board central processing module for any equipment data regarding operational characteristics of equipment on-board the locomotive, and requesting, with the central processing module, a download of previously uploaded equipment data from an off-board server if the on-board memory does not contain any equipment data. The method may also include receiving and storing equipment data from outputs of one or more of machine gauges, indicators, sensors, and controls in the on-board memory, processing and integrating the received equipment data with the central processing module, receiving equipment data and one or more control command signals from the off-board server via a communication device, communicating commands based on the equipment data and the received one or more control command signals to a locomotive control system on-board the locomotive, and actuating one or more operational control devices using the locomotive control system in order to change an operational configuration of the locomotive.

In yet another aspect, the present disclosure is directed to a computer-readable medium for use in maintaining data regarding operational characteristics of equipment on-board a locomotive. The computer-readable medium may include computer-executable instructions for performing a method including checking an on-board memory of the locomotive after start-up of the locomotive with an on-board central processing module for any equipment data regarding operational characteristics of equipment on-board the locomotive. The method may also include requesting, with the central processing module, a download of previously uploaded equipment data from an off-board server if the on-board memory does not contain any equipment data, receiving and storing equipment data from outputs of one or more of machine gauges, indicators, sensors, and controls in the on-board memory, processing and integrating the received equipment data with the central processing module, receiving equipment data and one or more control command signals from the off-board server via a communication device, communicating commands based on the equipment data and the received one or more control command signals to a locomotive control system on-board the locomotive, and actuating one or more operational control devices using the locomotive control system in order to change an operational configuration of the locomotive.

DETAILED DESCRIPTION

Figure 1:
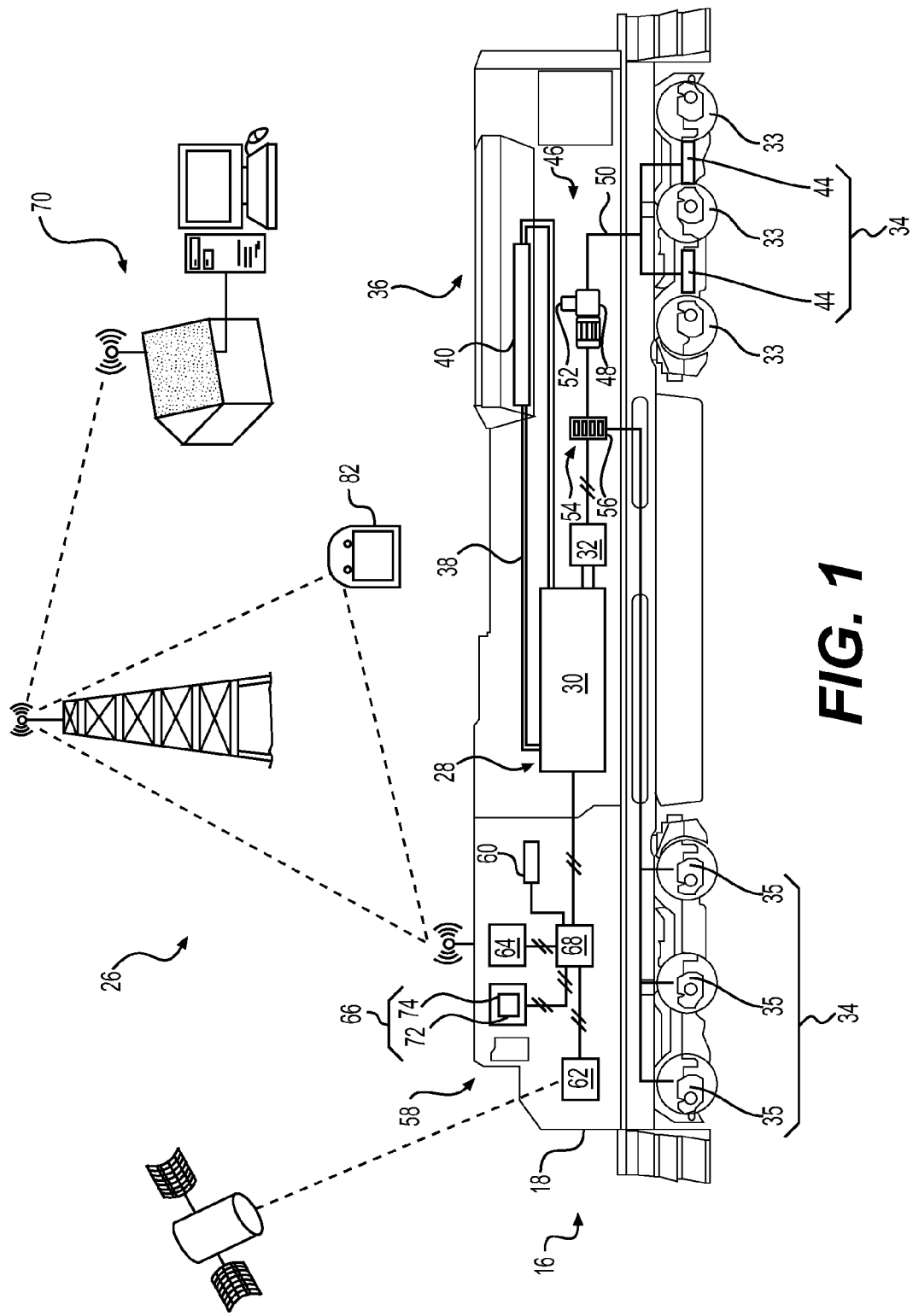
FIG. 1 is a schematic illustration of an exemplary locomotive and remote data backup system that may be used with the locomotive.

FIG. 1 shows an exemplary train asset 16 in communication with an exemplary disclosed remote data backup system 26 that may be associated with a railroad network. For the purposes of this disclosure, asset 16 in FIG. 1 is depicted as a locomotive 18. However, it is noted that any type of asset 16, such as a freight car, tanker, or other rail equipment, may be a train asset in communication with remote data backup system 26.

Each locomotive 18 or powered unit of the train may include a car body supported at opposing ends by a plurality of trucks. Each truck may be configured to engage a track via a plurality of wheels 33, and to support a frame of the car body. One or more traction motors 35 may be associated with one or all wheels 33 of a particular truck, and any number of engines and generators may be mounted to the frame within the car body to make up the propulsion subsystems on each of the powered units. The propulsion subsystems of each of the powered units may be further interconnected throughout the train along one or more high voltage power cables in a power sharing arrangement. Energy storage devices may also be included for short term or long term storage of energy generated by the propulsion subsystems or by the traction motors when the traction motors are operated in a dynamic braking or generating mode. Energy storage devices may include batteries, ultracapacitors, flywheels, fluid accumulators, and other energy storage devices with capabilities to store large amounts of energy rapidly for short periods of time, or more slowly for longer periods of time, depending on the needs at any particular time. The DC or AC power provided from the propulsion subsystems or energy storage devices along the power cable may drive AC or DC traction motors 35 to propel the wheels 33. Each of the traction motors 35 may also be operated in a dynamic braking mode as a generator of electric power that may be provided back to the power cables and/or energy storage devices. Control over engine operation (e.g., starting, stopping, fueling, and exhaust aftertreatment) and traction motor operation, as well as other locomotive controls, may be provided by way of various controls housed within a cab supported by the frame of the locomotive 18. In some implementations of this disclosure, initiation of these controls may be implemented in the cab of a lead powered unit in a lead consist of the train. In other alternative implementations, initiation of operational controls may be implemented off-board at an off-board server 70, or at a powered unit of a trailing consist.

Locomotive 18 may be a fuel-burning locomotive. For example, locomotive 18 may include an engine system 28 having one or more fuel-burning engines 30 (only one shown in FIG. 1). Engine 30 may be an internal combustion engine (e.g., a piston engine or a turbine engine) configured to burn a fuel (e.g., diesel, petrol, natural gas, propane, and/or kerosene) supplied by a fuel system in order to generate a mechanical power output. The output of engine 30 may be used to drive a generator 32 (e.g., an AC generator or a DC generator) configured to supply electricity to a traction system 34 having one or more traction motors 35 for propelling locomotive 18 on a plurality of wheels 33 and axles. Engine 30 may alternatively be configured to directly drive wheels 33 with the mechanical output via drivetrain components, such as gears, clutches, torque converters, and shafts.

A cooling system 36 may be configured to actively cool engine 30 and/or other components of locomotive 18. Cooling system 36 may include, for example, fluid conduits 38 that circulate a cooling fluid (e.g., water, propylene glycol, or other coolants) between a heat source, such as engine 30 or generator 32, and a heat sink, such as a heat exchanger 40. Heat exchanger 40 may include a number of fluid passages configured to allow heated fluid therein to transfer heat to a coolant passing between or around the fluid passages. Cooling system 36 may also include one or more cooling fluid pumps, valves, fans, sensors, and/or other components.

Locomotive 18 may also include one or more brake systems configured to reduce the track speed of locomotive 18. For example, the brake systems may include one or more braking devices 44 positioned near a rotary component such as a brake disk, or a brake drum. Braking devices may include a caliper and pads, shoes and linkages, magnetic brakes, or another type of braking device. As shown in FIG. 1, braking devices 44 may be actuated by a compressed air system 46. In other embodiments, braking devices may be powered hydraulically, mechanically, a combination thereof, or by another method. Locomotive 18 may also or alternatively include other types of braking systems, such as parking brakes, auxiliary brakes, and electronically controlled pneumatic brakes.

Compressed air system 46 may include one or more air compressors 48 configured to pressurize air for use throughout locomotive 18. Pressurized air conduits 50 may be configured to transport pressurized air from compressor 48 to various devices within locomotive 18, such as braking devices 44 and suspension equipment. Compressor 48 may be driven by an electric motor 52 that may be powered by generator 32, a battery, or another source of electricity. In other embodiments, compressor 48 may be autonomously powered by a dedicated engine.

An electrical system 54 may supply and/or control electrical power to various electrical devices associated with locomotive 18. Electrical system 54 may supply electrical power from generator 32, a dedicated engine and generator, one or more batteries or battery banks, a connection to grid power, or another source of electricity. Electrical power may be distributed throughout electrical system 54 via one or more circuit breakers 56. For example, electricity from generator 32 may be distributed to traction motors 35 via circuit breaker 56 for propelling locomotive 18. Electrical system 54 may also power a control system 58 and/or other electronic control devices. Electrical system 54 may include additional circuit breakers, fuses, receptacles, lights, and other components.

Control system 58 may include one or more components associated with manual and/or automatic control of locomotive 18. For example, control system 58 may include one or more sensors 60, a locating device 62, a communication device 64, a user interface 66, an on-board central processing module (CPM) 68, and operational control devices in communication with each of the other components. Additional and/or other components of control system 58 may be included, if desired. Components of control system 58 may be configured to communicate by wired (e.g., dedicated wire, multi-unit (MU) cable, local area network (LAN), controller area network (CAN), and wide area network (WAN)) and/or wireless (e.g., WiFi, Bluetooth, cellular, satellite, and RFID) connections. Communication device 64 may include a wireless modem, a locomotive interface gateway (LIG), and other communication components required for processing, modulating, transmitting, and receiving wireless signals.

Sensors 60 may be positioned throughout locomotive 18 and other assets 16 of a train. Sensors 60 may each be configured to generate a signal indicative of an operating parameter and/or an operational status of an associated system, subsystem, and/or component of locomotive 18. Sensors 60 may be configured to generate signals indicative of, for example, temperature, pressure, position, current, voltage, presence (e.g., via optical sensors, cameras, and proximity sensors), air flow, fuel flow, exhaust constituents, air/fuel ratio, and light intensity. One or more sensors 60 may be associated with each of the systems, subsystems, equipment, and/or components of locomotive 18. Signals generated by sensors 60 may also be indicative of an operational status of sensors 60 themselves and/or their associated systems, subsystems, equipment, and/or components. For example, the integrity, strength, and/or nature of the signals generated by sensors 60 may be indicative of whether the respective sensor and/or associated systems, subsystems, and/or components are functioning properly. Signals from sensors 60 may be communicated to CPM 68 for further processing.

Locating device 62 may be configured to determine and communicate an absolute and/or relative geographic location of locomotive 18. For example, locating device 62 may include a Global Positioning System (GPS) transponder configured to receive position signals from one or more GPS satellites, an Inertial Reference Unit (IRU), or any other locating device known in the art. Locating device 62 may communicate the positioning signals and/or other information to CPM 68 for further processing.

Communication device 64 may include any device configured to facilitate communications between CPM 68 and off-board entities, such as an off-board server 70. Communication device 64 may include hardware and/or software such as the LIG that enables communication device 64 to process, send and/or receive data messages through a wireless communication link. Communication device 64 may be configured to communicate via wireless communication platforms, such as by satellite, cellular, infrared, Bluetooth, WiFi, and/or other wireless communication platforms. Communication device 64 may also or alternatively be configured to communicate via a local area network (LAN) or another type of wired network that enables CPM 68 to exchange information with off-board entities.

User interface 66 may be located inside an operator station of locomotive 18, and may include a data entry module 72 for manually receiving data from an operator and a display 74 for displaying information to the operator. Data entry module 72 may include a keyboard, mouse, touchscreen, directional pad, selector buttons, or any other suitable features for recording manually entered data. User interface 66 may also include one or more operational control devices for controlling operations of locomotive 18. For example, user interface 66 may include a throttle control, an automatic brake control, an independent brake handle, a generator switch, a lighting control, and/or other controls. Operational control devices may embody levers, knobs, switches, buttons, slides, handles, touch screens, soft keys, and/or other types of controls. User interface 66 may also be configured to allow the operator to engage or communicate with train and/or train asset control systems. That is, information and requests for input from one or more control systems may be shown to the operator via display 74, and the operator may provide responses and/or other input via data entry module 72. Inputs entered via data entry module may be communicated to CPM 68 for further processing.

Off-board server 70 may represent one or more computing systems associated with a railroad network, a localized control station, wayside equipment, or other train assets 16 such as locomotive 18. Off-board server 70 may be configured to allow a user to engage a control system associated with multiple trains and/or train assets 16 in a railroad network. Information and requests for input from one or more train and/or train asset control systems may be shown to the user via off-board server 70. Off-board server 70 may also be configured to allow a user to provide responses and/or other inputs to train and/or train asset control systems. Off-board server 70 may be further configured to store periodically updated on-board equipment operational data received from CPM 68, perform comparisons between samples of data received from CPM 68 and the latest data stored on off-board server 70, and send updates for data to CPM 68 when the data stored at off-board server 70 is more up-to-date than samples of data received from CPM 68. Off-board server 70 may embody, for example, one or more of a laptop computer, a work station, a personal digital assistant, a mainframe, a cellular phone, a tablet, a computerized accessory, and/or other computing systems known in the art.

Figure 2:
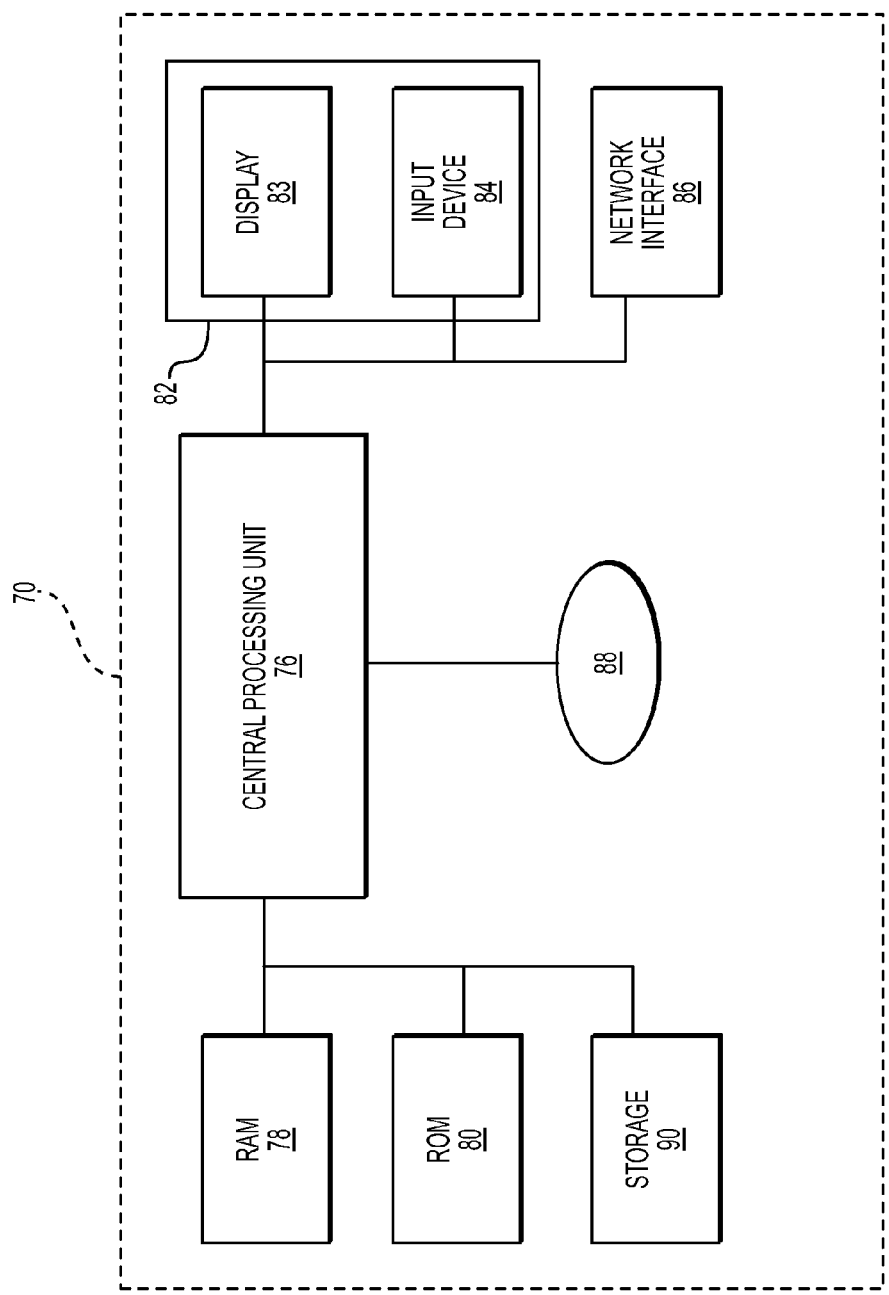
FIG. 2 is a diagrammatic illustration of an off-board server that may be used as part of the remote data backup system of FIG. 1.

As shown in FIG. 2, off-board server 70 may include a central processing unit (CPU) 76, a random access memory (RAM) 78, a read-only memory (ROM) 80, a user interface 82, a display 83, an input device 84, a network interface 86, a database 88 and storage 90. Off-board server 70 may include additional, fewer, and/or different components than those listed above. It is to be understood that the type and number of listed devices are exemplary only and not intended to be limiting.

CPU 76 may embody, for example, one or more specially-constructed or generic microprocessors configured to execute sequences of computer program instructions to perform various processes in connection with remote data backup system 26. The computer program instructions may be loaded into RAM 78 for execution by CPU 76 from ROM 80. In additional or alternative implementations, executable computer program instructions may be embodied on a computer-readable medium. During operation, CPU 76 and CPM 68 may cooperate via communication device 64 to carry out various processes in connection with remote data backup system 26.

Storage 90 may embody any appropriate type of mass storage provided to store information that CPU 76 and/or controller 68 may access to perform various processes. For example, storage 90 may include one or more hard disk devices, optical disk devices, removable memory devices, solid state memory devices, flash memory devices, and/or other storage devices.

Off-board server 70 may be configured to interface with a user via user interface 82. User interface 82 may include a display 83 and input device 84. For example, user interface 82 may display information to users of off-board server 70 via display 83 and receive user inputs via input device 84. User interface 82 may be any appropriate type of display device, such as a computer monitor, laptop screen, and/or cellular phone screen. Input device 84 may include, for example, a keyboard, a mouse, a touch screen, buttons, soft keys, and/or other wired or wireless user interfaces known in the art.

Network interface 86 may facilitate wireless and/or wired communications such that off-board server 70 may be remotely accessed by CPM 68 and/or other off-board systems. Network interface 86 may include and/or be associated with any suitable wired and/or wireless network architecture, such as, for example, a cellular telephone-based network (such as a PBX or POTS), a satellite-based network, LAN, WAN, CAN, a dedicated intranet, the Internet, and/or any other suitable network architecture known in the art.

Database 88 may contain, among other things, information relating to each train, information relating to each asset 16, and/or information relating to operational states or conditions of each asset 16. For example, database 88 may store an up-to-date list of every train and associated asset 16 operating in a railroad network. Database 88 may also store an up-to-date list of every system, equipment, and component associated with each asset 16, such as locomotive 18, and on-board equipment operational data associated with each asset 16. The latest information for each asset 16 may include, for example, a name, a serial number, a software version number, a system list, a component list, a part number list, and/or a date of manufacture for the asset. The train information and asset information may be kept current by, for example, automatic or manual electronic updates and/or by an authorized user of off-board server 70.

CPM 68 on-board locomotive 18 may be configured to check with off-board server 70 each time locomotive 18 is started up if CPM 68 determines that on-board equipment operational data is not present in a memory associated with CPM 68. CPM 68 may also be configured to periodically send samples of equipment operational data stored on-board locomotive 18 to off-board server 70 as part of a process for maintaining the data and ensuring that the most up-to-date data is always being used by CPM 68 and CPU 76. The off-board server 70 may be configured to perform comparisons between the samples of data received from CPM 68 and the latest data stored at off-board server 70, and send any available updates for the data, or other applications or commands to CPM 68.

The information contained in database 88 may include diagnostic information that can be used to identify operational status or fault conditions associated with locomotive 18. For example, the diagnostic information may include tables of fault codes and associated triggering mechanisms, such as, signal criteria, operating parameter thresholds or limits (e.g., temperatures, pressures, levels, and times), and or other triggers. Each fault code may correspond to or be indicative of an issue pertaining to a type of asset, an asset system, a system component, or maintenance aspect. Triggering mechanisms may be monitored or detected via sensors 60, wayside equipment, operators, and/or other diagnostic devices.

CPM 68 (referring to FIG. 1) may embody, for example, an electronic control module (ECM), or another processor capable of executing, and/or or outputting command signals in response to received and/or stored data. CPM 68 may include means for accessing, reading, and processing stored information and for displaying such information by way of user interface 66 and/or 82. For example, CPM 68 may embody a single microprocessor or multiple microprocessors that include a means for monitoring input from user interfaces 66, 82, and/or sensors 60. CPM 68 may include a memory, a secondary storage device, and a processor, such as a central processing unit or any other means for accomplishing a task consistent with the present disclosure. Commercially available microprocessors can be configured to perform the functions of CPM 68. It should be appreciated that CPM 68 could readily embody a general machine controller capable of controlling numerous other machine functions. Various other known circuits may be associated with CPM 68, including signal-conditioning circuitry, communication circuitry, and other appropriate circuitry.

CPM 68 may be configured to continually receive signals from sensors 60 and analyze the signals to determine an operational status of sensors 60 and/or the equipment, components, systems, and/or subsystems they monitor. For example, CPM 68 may be configured to compare the signal generated by each sensor 60 to thresholds, ranges, or limits associated with fault codes stored within its memory. Based on each comparison, CPM 68 may be configured to determine the operational status of each component, system, and subsystem of locomotive 18. When a comparison indicates that an associated fault code is active, CPM 68 may retrieve the diagnostic information associated with the fault code from database 88. Based on the fault code, the associated diagnostic information, and/or other information, CPM 68 may be configured to generate a maintenance message and display the message to a user via a graphical user interface (GUI).

On-board control system 58 and CPM 68 may include an energy management system configured to determine, e.g., one or more of throttle requests, dynamic braking requests, and pneumatic braking requests for one or more of the powered and non-powered units of the train. The energy management system may be configured to make these various requests based on a variety of measured operational parameters, track conditions, freight loads, trip plans, and predetermined maps or other stored data with one or more goals of improving availability, safety, timeliness, overall fuel economy and emissions output for individual powered units, consists, or the entire train. The cab of a lead locomotive 18 in each of one or more consists in a train may also house a plurality of input devices and control system interfaces. The input devices may be used by an operator to manually control the locomotive, or may be controlled electronically via messages received from the off-board server 70. Input devices may include, among other things, an engine run/isolation switch, a generator field switch, an automatic brake handle, an independent brake handle, a lockout device, and any number of circuit breakers. Manual input devices may include switches, levers, pedals, wheels, knobs, push-pull devices, touch screen displays, etc.

Operation of the engines, generators, inverters, converters, and other auxiliary devices may be at least partially controlled by switches or other input devices that may be manually movable between a run or activated state and an isolation or deactivated state by an operator of the locomotive 18. The input devices may be additionally or alternatively activated and deactivated by solenoid actuators or other electrical, electromechanical, or electro-hydraulic devices. As one example, a toggling device associated with an engine may be manually and/or autonomously moved to a run state, in which the engine may be allowed to start in response to a command generated from on-board the locomotive 18, or in response to a command received from the off-board server 70. The toggling device may also be moved to an isolation state, in which the engine may be shutdown (i.e., turned off) and not allowed to restart. In one embodiment, moving the toggling device to the run state causes startup of the engine and, likewise, moving the toggling device to the isolation state causes the engine to shut down. In another embodiment, moving the toggling device to the run state simply allows subsequent startup of the engine using other input devices, and the toggling device is only moved to the isolation state after engine shutdown to inhibit restart of the engine. In either scenario, the engine may not be restarted from on-board the train while the toggling device is in the isolation state. The operator of the locomotive may manually move the toggling device to the run state at the start of a work shift or trip, and move the toggling device to the isolation position at the end of the work shift or trip. The off-board server 70 may also require compliance with security protocols to ensure that only designated personnel may remotely activate or deactivate components on-board the locomotive 18 from the off-board server 70 after certain prerequisite conditions have been met. The off-board server 70 may include various security algorithms or other means of comparing an operator authorization input with a predefined security authorization parameter or level. The security algorithms may also establish restrictions or limitations on controls that may be performed based on the location of a locomotive, authorization of an operator, and other parameters.

Circuit breakers are examples of operational control devices that may be associated with particular components or subsystems of a locomotive, and configured to trip when operating parameters associated with the components or subsystems deviate from expected or predetermined ranges. For example, circuit breakers may be associated with power directed to individual traction motors, HVAC components, and lighting or other electrical components, circuits, or subsystems. When a power draw greater than an expected draw occurs, the associated circuit breaker may trip, or switch from a first state to a second state, to interrupt the corresponding circuit. In some implementations of this disclosure, a circuit breaker may be associated with an on-board control system or communication unit that controls wireless communication with the off-board server. After a particular circuit breaker trips, the associated component or subsystem may be disconnected from the main electrical circuit of the locomotive 18 and remain nonfunctional until the corresponding breaker is reset. The circuit breakers may be manually tripped or reset. Alternatively or in addition, the circuit breakers may include actuators or other control devices that can be selectively energized to autonomously or remotely switch the state of the associated circuit breakers in response to a corresponding command received from the off-board server 70. In some embodiments, a maintenance signal may be transmitted to the off-board server 70 upon switching of a circuit breaker from a first state to a second state, thereby indicating that action such as a reset of the circuit breaker may be needed. On-board equipment operational data such as signals indicative of actuation or non-actuation of various operational control devices may be stored by CPM 68 in one or more memories on-board locomotive 18 and periodically uploaded to off-board server 70 to maintain the most up-to-date data and information associated with operation of a train.

An exemplary implementation of CPM 68 according to this disclosure may include an energy management system, which may be configured to automatically determine one or more of throttle requests, dynamic braking requests, and pneumatic braking requests for one or more of the powered and non-powered units of the train. The energy management system may be configured to make these various requests based on a variety of measured on-board equipment operational parameters, track conditions, freight loads, trip plans, and predetermined maps or other stored data with a goal of improving one or more of availability, safety, timeliness, overall fuel economy and emissions output for individual locomotives, consists, or the entire train. The cab of the locomotive 18 may also house a plurality of input devices and control system interfaces. The input devices may be used by an operator to manually control the locomotive, or may be controlled electronically via messages received from off-board the train. Input devices may include, among other things, an engine run/isolation switch, a generator field switch, an automatic brake handle (for the entire train and locomotives), an independent brake handle (for the locomotive only), a lockout device, and any number of circuit breakers. Manual input devices may include switches, levers, pedals, wheels, knobs, push-pull devices, and touch screen displays. CPM 68 may also include a microprocessor-based locomotive control system having at least one programmable logic controller (PLC), a cab electronics system, and an electronic air (pneumatic) brake system, all mounted within a cab of the locomotive 18. The cab electronics system may comprise at least one integrated display computer configured to receive and display data from the outputs of one or more of machine gauges, indicators, sensors, and controls. The cab electronics system of CPM 68 may be configured to process and integrate the received data, receive command signals from the off-board server 70, and communicate commands such as throttle, dynamic braking, and pneumatic braking commands to the microprocessor-based locomotive control system.

The microprocessor-based locomotive control system of CPM 68 may be communicatively coupled with the traction motors, engines, generators, braking subsystems, input devices, actuators, circuit breakers, and other devices and hardware used to control operation of various components and subsystems on the locomotive 18. In various alternative implementations of this disclosure, some operating commands, such as throttle and dynamic braking commands, may be communicated from the cab electronics system to the locomotive control system of CPM 68, and other operating commands, such as braking commands, may be communicated from the cab electronics system to a separate electronic air brake system. One of ordinary skill in the art will recognize that the various functions performed by the locomotive control system and electronic air brake system may be performed by one or more processing modules or controllers through the use of hardware, software, firmware, or various combinations thereof. Examples of the types of controls that may be performed by the locomotive control system may include radar-based wheel slip control for improved adhesion, automatic engine start stop (AESS) for improved fuel economy, control of the lengths of time at which traction motors are operated at temperatures above a predetermined threshold, control of generators/alternators, control of inverters/converters, the amount of exhaust gas recirculation (EGR) and other exhaust aftertreatment processes performed based on detected levels of certain pollutants, and other controls performed to improve safety, increase overall fuel economy, reduce overall emission levels, and increase longevity and availability of the locomotives. The at least one PLC of the locomotive control system of CPM 68 may also be configurable to selectively set predetermined ranges or thresholds for monitoring operating parameters of various subsystems. When a component detects that an operating parameter has deviated from the predetermined range, or has crossed a predetermined threshold, a maintenance signal may be communicated to off-board server 70. The at least one PLC of the locomotive control system of CPM 68 may also be configurable to receive one or more command signals indicative of at least one of a throttle command, a dynamic braking readiness command, and an air brake command, and output one or more corresponding command control signals configured to at least one of change a throttle position, activate or deactivate dynamic braking, and apply or release a pneumatic brake, respectively.

The cab electronics system of CPM 68 may provide integrated computer processing and display capabilities on-board the locomotive 18, and may be communicatively coupled with a plurality of cab gauges, indicators, and sensors, as well as being configured to receive commands from the off-board server 70. The cab electronics system of CPM 68 may be configured to process outputs from one or more of the gauges, indicators, and sensors, and supply commands to the locomotive control system of CPM 68. In various implementations, the off-board server 70 may comprise a laptop, hand-held device, or other computing device or server with software, encryption capabilities, and Internet access for communicating with CPM 68 on-board a lead locomotive of a lead consist and a lead locomotive of one or more trailing consists. Control commands generated by the cab electronics system of CPM 68 on a lead locomotive of a lead consist may be communicated to the locomotive control system of CPM 68 on the lead locomotive of the lead consist, and may be communicated in parallel via the communication device 64 to the off-board server 70. The communication device 64 may include the locomotive interface gateway (LIG), a WiFi/cellular modem, and any other communication equipment required to modulate and transmit equipment operational data and control command signals off-board the locomotive, and receive and process up-to-date equipment operational data supplied from off-board server 70 and control command signals on-board the locomotive.

The control systems and interfaces on-board and off-board each locomotive of a train may embody single or multiple microprocessors, field programmable gate arrays (FPGAs), digital signal processors (DSPs), and programmable logic controllers (PLCs), which include means for controlling operations of the train in response to operator requests, built-in constraints, sensed operational parameters, and/or communicated instructions from the off-board server 70. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

Locomotive 18 may be outfitted with any number and type of sensors 60 known in the art for generating signals indicative of associated on-board equipment operating parameters. In one example, locomotive 18 may include a temperature sensor configured to generate a signal indicative of a coolant temperature of an engine on-board the locomotive. Additionally or alternatively, sensors may include brake temperature sensors, exhaust sensors, fuel level sensors, pressure sensors, knock sensors, reductant level or temperature sensors, speed sensors, motion detection sensors, location sensors, or any other sensor known in the art. The signals generated by the sensors may be directed to the cab electronics system of CPM 68 for further processing and generation of appropriate commands.

Any number and type of warning devices may also be located on-board each locomotive, including an audible warning device and/or a visual warning device. Warning devices may be used to alert an operator on-board a locomotive of an impending operation, for example startup of the engine(s). Warning devices may be triggered manually from on-board the locomotive (e.g., in response to movement of a component to the run state) and/or remotely from off-board the locomotive (e.g., in response to commands from the off-board server 70.) When triggered from off-board the locomotive, a corresponding command signal used to initiate operation of the warning device may be communicated to the cab electronics system of CPM 68.

The off-board server 70 may include any means for monitoring, recording, storing, indexing, processing, and/or communicating various operational aspects and up-to-date on-board equipment operational data for the locomotive 18. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or non-transitory computer-readable media such as computer chips and secondary storage devices, including hard disks, floppy disks, optical media, CD-ROM, or other forms of RAM or ROM.

The off-board server 70 may also be configured to execute instructions stored on computer readable media to perform methods of remote data backup for the locomotive 18. That is, as will be described in more detail in the following section, up-to-date, real-time on-board equipment operational data associated with operations of the locomotive may be selectively uploaded to and downloaded from the off-board server 70.

Communication between the on-board cab electronics system of CPM 68 and off-board server 70 may be facilitated via various communication units such as communication device 64 spaced along a train. The communication units may include hardware and/or software that enables sending and receiving of data messages between the powered units of the train and the off-board server 70. The data messages may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable the communication units to exchange information between the off-board server 70 and the various components and subsystems of the train.

The integrated cab electronics system of CPM 68 on locomotive 18 may also be configured to receive and generate commands for configuring or reconfiguring various switches and handles on-board locomotive 18 as required before the train begins on a journey, or after a failure occurs that requires reconfiguring of locomotive 18. Examples of switches and handles that may require configuring or reconfiguring before a journey or after a failure may include an engine run switch, a generator field switch, an automatic brake handle, and an independent brake handle. Remotely controlled actuators on-board locomotive 18 in association with each of the switches and handles may enable remote, autonomous configuring and reconfiguring of each of the devices. For example, before the train begins a journey, or after a critical failure has occurred on locomotive 18, commands may be sent from the off-board server 70 to locomotive 18 in order to automatically reconfigure all of the switches and handles as required without the need for an operator to be on-board locomotive 18. The remote data backup system and methods of the present disclosure ensure that the latest, most up-to-date on-board equipment operational data is available either from on-board memory associated with CPM 68 or from off-board server 70. Following the reconfiguring of all of the various switches and handles on-board locomotive 18, off-board server 70 may also send messages to the cab electronics systems of CPM 68 on-board locomotive 18 appropriate for generating other operational commands such as changing throttle settings, activating or deactivating dynamic braking, and applying or releasing pneumatic brakes. This capability saves the time and expense of having to delay the train while sending an operator to each of the locomotives on the train to physically switch and reconfigure all of the devices required.

A train may include multiple rail cars (including powered and/or non-powered rail cars or units) linked together as one or more consists or a single rail car (a powered or non-powered rail car or unit). The remote data backup system 26 may provide for cost savings, improved safety, increased reliability, operational flexibility, and convenience in the control of the train through communication of up-to-date, on-board equipment operational data between CPM 68 on-board locomotive 18 and off-board server 70. The remote data backup system 26 may also convey a variety of network data and command and control signals in the form of messages communicated to and from locomotive 18, such as packetized data or information that is communicated in data packets, to and from the off-board server 70. The off-board server 70 may also be configured to receive remote alerts and other data from CPM 68 on-board locomotive 18, and forward those alerts and data to desired parties via pagers, mobile telephone, email, and online screen alerts. The data communicated between the CPM 68 of locomotive 18 and off-board server 70 may include signals indicative of various operational parameters associated with components and subsystems of the train, and command and control signals operative to change the state of various circuit breakers, throttles, brake controls, actuators, switches, handles, relays, and other electronically-controllable devices on-board locomotive 18.

Although the present disclosure only discusses a single off-board server 70, one of ordinary skill in the art will recognize that remote data backup procedures in accordance with various implementations of this disclosure may be performed between CPM 68 on-board locomotive 18 and a rail-yard back office system, one or more remotely located and redundant servers (such as in the "cloud"), a third party server, a computer disposed in a rail yard tower, and the like. Alternatively, the off-board server 70 may include a satellite that transmits the data down to locomotive 18 or a cellular tower disposed remote from locomotive 18. Other devices may be used in conjunction with the off-board server 70 to wirelessly receive and transmit the equipment operational data. For example, other wayside equipment, base stations, or back office servers may be used in conjunction with the off-board server 70. By way of example only, the off-board server 70 may use one or more of the Transmission Control Protocol (TCP), Internet Protocol (IP), TCP/IP, User Datagram Protocol (UDP), or Internet Control Message Protocol (ICMP) to communicate data over the Internet with CPM 68 of locomotive 18.

Figure 3:
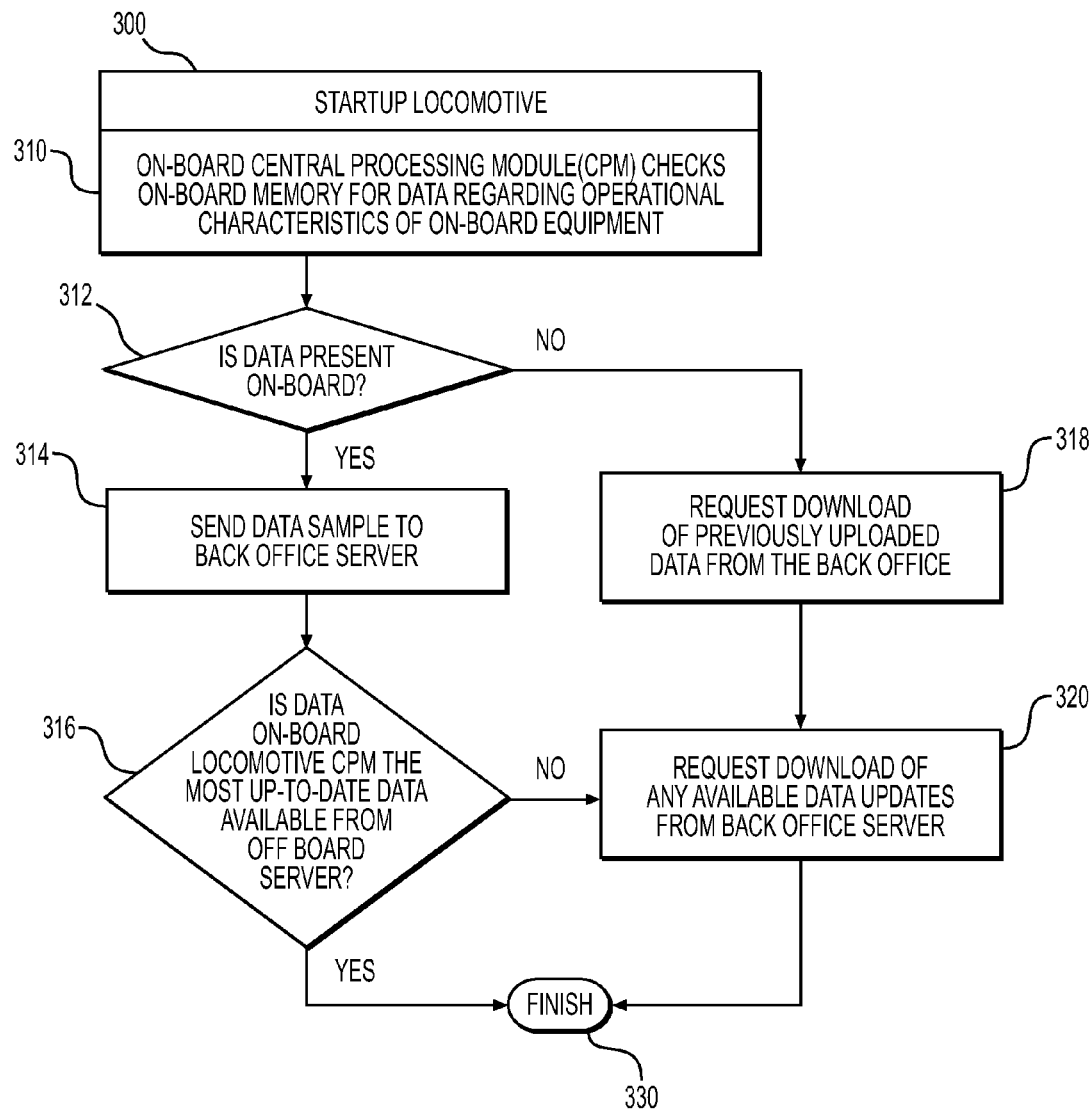
FIG. 3 is a flow chart illustrating an exemplary method of implementing data backup using the system of FIG. 1.

An exemplary method for performing remote data backup for one or more locomotives in a train in accordance with various aspects of this disclosure is illustrated in FIG. 3, and described in more detail in the following section.

INDUSTRIAL APPLICABILITY

The remote data backup system of the present disclosure may be used with any locomotive or group of locomotives or other powered machines to protect against the loss of important on-board equipment operational data. The central processing module (CPM) 68 on-board a machine such as a locomotive 18 may control the collection of equipment operational data on a continual or intermittent basis. A full or partial failure of all or a portion of the CPM or a memory associated with the CPM could result in the loss of important equipment operational data. The equipment operational data may be acquired by a variety of machine gauges, sensors, indicators and controls, and may include signals indicative of throttle control settings, brake settings, fluid levels, fluid flow rates, temperatures, pressures, electrical characteristics, and control command settings intended to change operational configurations of the locomotive. The equipment operational data may also include signals indicative of the actuation or failure of actuation for various operational control devices, such as automatic brake handles, independent brake handles, and generator switches, which may be controlled in order to change the operational configuration of a locomotive. The on-board equipment operational data may be transmitted in real time to off-board server 70 in order to provide an up-to-date backup of the data. The off-board server may also rely on having the most up-to-date data regarding various operational parameters on the locomotive so that control commands may be initiated from the off-board server when there is a need to ensure remote access to particular functions of the machines. These functions may normally be controlled manually from on-board each locomotive, and remote access to these functions from the off-board server may provide a way to enable automatic train operation (ATO) when human operators are not present or available at the locomotives. An exemplary implementation of a method for maintaining the equipment operational data on-board a locomotive is shown in FIG. 3.

An exemplary method of maintaining the equipment operational data on-board a locomotive may start automatically upon startup of the locomotive at Step 300 in FIG. 3. As soon as the locomotive is started, the on-board central processing module (CPM) 68 may perform a check of on-board memory associated with the CPM 68 for any data regarding operational characteristics of on-board equipment at Step 310. Various circumstances may have resulted in the CPM 68 or associated memory having lost earlier-stored data. For example, replacement of a damaged CPM, a power surge, or physical damage to the CPM may result in the loss of data. If CPM 68 determines at Step 312 that the memory no longer contains any on-board equipment operational data (Step 312: No), then CPM 68 may automatically request a download of previously uploaded data from off-board (back office) server 70 at Step 318.

If on-board equipment operational data does exist in the one or more memories associated with CPM 68 (Step 312: Yes), CPM 68 may nevertheless continuously or intermittently send data samples to off-board (back office) server 70 at Step 314 in order to ensure that the data stored on-board the locomotive is the latest available equipment operational data. At Step 316, off-board server 70 may perform a comparison between the sample of data received from CPM 68 and data that has already been previously uploaded to off-board server 70 in order to determine whether the data currently on-board the locomotive is the most up-to-date data available from off-board server 70. If the comparison of data results in a determination that the data currently available on-board the locomotive is not the most up-to-date data available (Step 316: No), then CPM 68 may request a download of any available data updates from off-board (back office) server 70 at Step 320, and the backup procedure is finished at Step 330. If the comparison of data results in a determination that the data is the most up-to-date data available (Step 316: Yes), then the accuracy of the equipment operational data on-board the locomotive is ensured, and the backup procedure is finished at Step 330.

It will be apparent to those skilled in the art that various modifications and variations can be made to the remote data backup system and method of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A remote data backup system for a locomotive, the backup system comprising:
    a communication unit on-board the locomotive configured to be communicatively coupled with an off-board server, the communication unit being configured to transmit data to the off-board server and receive at least one of data, commands, and applications from the off-board server;
    a central processing module on-board the locomotive, the central processing module comprising:
        a cab electronics system configured to:
            receive and store on-board equipment operational data from outputs of one or more of machine gauges, indicators, sensors, and controls in an on-board memory;
            process and integrate the received equipment operational data;
            receive additional equipment operational data and one or more control command signals from the off-board server;
            communicate commands based on the equipment operational data and the received one or more control command signals;
            perform a self-check upon startup of the locomotive to determine whether equipment operational data is present in the on-board memory; and
            request a download of previously uploaded data from the off-board server if the self-check determines that no equipment operational data is present in the on-board memory; and
        a locomotive control system, wherein the locomotive control system is configured to receive commands communicated from the cab electronics system, and actuate one or more operational control devices based on the commands from the cab electronics system; and
    the central processing module being configured to establish wireless communication with the off-board server through the communication unit.

2. The remote data backup system of claim 1, wherein the communication unit includes a wireless modem.

3. The remote data backup system of claim 1, wherein the communication unit includes a wireless modem configured to communicate data messages in the form of packetized data with the off-board server.

4. The remote data backup system of claim 3, wherein the communication unit is configured to communicate with the off-board server over the Internet.

5. The remote data backup system of claim 1, wherein commands received at the locomotive control system include at least one of a throttle command, a dynamic braking readiness command, and a brake command.

6. The remote data backup system of claim 1, wherein the control command signals received from the off-board server are configured to at least one of change a throttle position, activate or deactivate dynamic braking, and apply or release a brake.

7. The remote data backup system of claim 1, wherein the communication unit further includes:
    a locomotive interface gateway located on the locomotive, the locomotive interface gateway being configured to receive and modulate commands from the cab electronics system and communicate the modulated commands to the off-board server via a wireless modem.

8. The remote data backup system of claim 1, wherein the cab electronics system is further configured to:
    send a sample of any equipment operational data stored in the on-board memory to the off-board server; and
    receive any updates to the equipment operational data stored in the on-board memory from the off-board server if a comparison of the sample of equipment operational data with equipment operational data already uploaded by the central processing module on-board the locomotive to the off-board server indicates that the equipment operational data stored in the on-board memory is not the most up-to-date equipment operational data available.

9. The remote data backup system of claim 1, wherein the locomotive control system is configured to control one or more of circuit breakers, throttle settings, dynamic braking, and pneumatic braking in accordance with the commands received from the cab electronics system.

10. A method of maintaining data regarding operational characteristics of equipment on-board a locomotive, the method comprising:
    starting up the locomotive;
    checking an on-board memory of the locomotive with an on-board central processing module for any equipment data regarding operational characteristics of equipment on-board the locomotive;
    requesting, with the central processing module, a download of previously uploaded equipment data from an off-board server if the on-board memory does not contain any equipment data;

receiving and storing equipment data from outputs of one or more of machine gauges, indicators, sensors, and controls in the on-board memory;

processing and integrating the received equipment data with the central processing module;

receiving equipment data and one or more control command signals from the off-board server via a communication device;

communicating commands based on the equipment data and the received one or more control command signals to a locomotive control system on-board the locomotive; and actuating one or more operational control devices using the locomotive control system in order to change an operational configuration of the locomotive.

11. The method of claim 10, further including:

sending, with the central processing module and the communication device, a sample of any equipment data stored in the on-board memory to the off-board server; and receiving any updates to the equipment data stored in the on-board memory from the off-board server if a comparison of the sample of equipment data with equipment data already uploaded by the central processing module on-board the locomotive to the off-board server indicates that the equipment data stored in the on-board memory is not the most up-to-date equipment data available.

12. The method of claim 10, wherein communication of equipment data and control command signals between the on-board central processing module and the off-board server is performed over a wireless network.

13. The method of claim 12, wherein communication of at least one of equipment data and control command signals includes communication of packetized data between the on-board central processing module and the off-board server.

14. The method of claim 12, wherein communication of equipment data and control command signals between the on-board central processing module and the off-board server occurs at least partially over the Internet.

15. The method of claim 10, wherein communicating commands to the locomotive control system includes communicating at least one of a throttle command, a dynamic braking readiness command, and a brake command.

16. The method of claim 10, wherein actuating one or more operational control devices using the locomotive control system includes at least one of changing a throttle position, activating or deactivating dynamic braking, and applying or releasing a brake.

17. The method of claim 10, wherein receiving equipment data and one or more control command signals from the off-board server, and communicating commands based on the equipment data and the received one or more control command signals to the locomotive control system, includes modulating the one or more control command signals using a locomotive interface gateway located on the locomotive as part of the communication device.

18. A non-transitory computer-readable medium for use in maintaining data regarding operational characteristics of equipment on-board a locomotive, the computer-readable medium comprising computer-executable instructions for performing a method comprising:

checking an on-board memory of the locomotive after start-up of the locomotive with an on-board central processing module for any equipment data regarding operational characteristics of equipment on-board the locomotive;

requesting, with the central processing module, a download of previously uploaded equipment data from an off-board server if the on-board memory does not contain any equipment data;

receiving and storing equipment data from outputs of one or more of machine gauges, indicators, sensors, and controls in the on-board memory;

processing and integrating the received equipment data with the central processing module;

receiving equipment data and one or more control command signals from the off-board server via a communication device;

communicating commands based on the equipment data and the received one or more control command signals to a locomotive control system on-board the locomotive; and actuating one or more operational control devices using the locomotive control system in order to change an operational configuration of the locomotive.

19. The non-transitory computer-readable medium of claim 18, wherein the method further includes:

sending, with the central processing module and the communication device, a sample of any equipment data stored in the on-board memory to the off-board server; and receiving any updates to the equipment data stored in the on-board memory from the off-board server via the communication device if a comparison of the sample of equipment data with equipment data already uploaded by the central processing module on-board the locomotive to the off-board server indicates that the equipment data stored in the on-board memory is not the most up-to-date equipment data available.

20. The non-transitory computer-readable medium of claim 18, wherein actuating one or more operational control devices using the locomotive control system includes at least one of changing a throttle position, activating or deactivating dynamic braking, and applying or releasing a brake.

* * * * *